ced. Sept. 17, 1957

2,806,848

VINYLATION

John J. Nedwick, Philadelphia, Pa., assignor to Rohm & Haas Company, Philadelphia, Pa., a corporation of Delaware No Drawing. Application September 10, 1956, Serial No. 608,656

9 Claims. (Cl. 260—239.3)

This invention deals with a process for preparing N-vinyl lactams in an efficient and expeditious manner.

It has been proposed to prepare N-vinyl lactams by passing acetylene gas under pressure into a mixture of lactam and an alkali metal catalyst at a temperature usually between 100° and 150° C. and although lower and higher temperatures have been mentioned, they are not practical because reaction becomes excessively slow with any lower temperature and the reaction is not improved at higher temperatures where the hazards of working with acetylene gas at higher temperatures under pressure become increasingly more serious. Furthermore, side reactions and losses of materials become very serious.

One of the difficulties of the previously proposed procedure wherein acetylene gas diluted with nitrogen for safety is passed into a lactam mixed with an alkali metal catalyst at a reacting temperature is that the reaction proceeds very slowly and many hours are required before up-take of acetylene ceases. Now, not all of this up-take corresponds to actual vinylation, as other reactions of acetylene occur such as polymerization. Also, the proportion of catalyst used must be appreciable. It is not recoverable and, furthermore, as thus used, it seems to cause loss of at least an equivalent amount of the starting lactam. It can cause a splitting of the lactam ring with formation of a carboxylate. The catalyst also promotes a type of polymerization leading to linear polyamides, a reaction which increases particularly in the lower temperature range, as the catalyst is used up or becomes lower in concentration. Considerable experience with the prior art method has demonstrated that it is neither efficient nor expeditious and that the actual yields are not favorable, even though the consumption of acetylene might indicate a considerable conversion.

I discovered that a considerable improvement in efficiency with rapid reaction was obtained when acetylene gas was passed under pressure into cold lactam containing catalyst and the reaction mixture was then heated entirely in liquid phase. This, of course, requires subjecting the reaction mixture to considerable pressure, but no hazard is created thereby as there is no gas phase and pressure is always sufficient to keep acetylene dissolved and keep the reaction mixture in the liquid state. This advantageous method of proceeding I described in my application Serial No. 538,769, filed October 5, 1955, of which the present application is a continuation-in-part.

I now find that this method of reacting in liquid phase can be further improved by operating in the upper part of the stated range of temperature, 200° to 280° C., preferably at 210° to 250° C., and supplying catalyst when the reaction mixture has been brought into this relatively high temperature range under pressure to maintain the liquid phase. The amount of catalyst then used can be reduced, resulting in a definite saving of material, in a markedly reduced production of by-products, and in an increased yield of N-vinyl lactam. Furthermore, the reaction requires but a few minutes at most in contrast to the many hours of the prior art method.

The lactams which are preferably used for vinylation have the formula

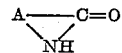

where A is an alkylene group of three to about ten carbon atoms with three to five carbon atoms connecting the —NH— and carbonyl groups. The preferred lactams thus contain from four to eleven total carbon atoms. There may thus be used pyrrolidinone, piperidone, or caprolactam or these heterocycles with C-substituents, as in 3-methyl pyrrolidinone, 4-methyl pyrrolidinone, 5-methyl pyrrolidinone, 3-ethyl pyrrolidinone, 3-butyl pyrrolidinone, 3,3-dimethyl pyrrolidinone, 4,5-dimethyl pyrrolidinone, 5,5-dimethyl pyrrolidinone, 3,3,5-trimethyl pyrrolidinone, 5-methyl-5-ethyl pyrrolidinone, 3,4,5-trimethyl-3-ethyl pyrrolidinone, 6-methyl-2-piperidone, 6-ethyl-2-piperidone, 3,5-dimethyl-2-piperidone, 4,4-dimethyl-2-piperidone, 6-propyl-2-piperidone, 3-octyl piperidone, 7-methyl caprolactam, 7-ethyl caprolactam, 4- or 5-isopropyl caprolactam, 4- or 5-butyl caprolactam, 4- or 5-tert-butyl caprolactam, 4- or 5-tert-octyl caprolactam, 4- or 5-tert-nonyl caprolactam, 3,7-dimethyl caprolactam, 3,5-dimethyl caprolactam, 4,6-dimethyl caprolactam, 3,5,7-trimethyl caprolactam, 2-methyl-4-isopropyl caprolactam, or 5-isopropyl-7-methyl caprolactam.

As catalysts, there are used strongly alkaline derivatives of the alkali metals, sodium and potassium, including potassium hydroxide, or sodium hydroxide, these alkali metals themselves, the sodium and potassium salts of the lactams, the metal replacing the hydrogen on the nitrogen, or a sodium or potassium alkoxide, such as sodium methoxide, sodium ethoxide, potassium butoxide, or potassium ethoxyethoxide. The several latter types of catalysts may be prepared by dissolving an alkali metal in a lactam or in an alcohol and used in solution in an excess of these materials. Also, the alkali metal alkoxide itself may be supplied as catalyst. It will be noted the preferred alkali metals have atomic weights from 23 to 39.

It is interesting to note that commercial alkali metal hydroxides can be used here or even strong solutions thereof, as the reaction system need not be anhydrous. Thus, the common 85% potassium hydroxide can be used and fairly good results can be obtained with 50% caustic.

The amount of catalyst used in the process of this invention may vary from about 0.01 mole percent up to about five mole percent based on the lactam. Preferably the amount of catalyst is from 0.1 mole percent to 2.5 mole percent based on the lactam.

The amount of catalyst used is kept as low as is consistent with good operation of the process. This will depend in part upon the particular kind of apparatus used and the conditions of operation. I have observed that if all of the catalyst is mixed with lactam, acetylene is added, and the mixture is then heated up, most of the catalyst is used up before a temperature is reached at which the vinylation reaction proceeds with reasonable speed. I avoid this difficulty by supplying at least part of the catalyst after the mixture of lactam and acetylene has reached a temperature where rate of vinylation exceeds the rate of consumption of catalyst. Vinylation then proceeds with considerable rapidity. Heat of reaction is rapidly evolved, and this must be taken into consideration in design of apparatus and method of operation, as by multiple injection of small portions of catalyst.

It is entirely practical to add all catalyst only after the mixture of lactam and acetylene has been heated to about 200° C. or more. This catalyst may be then pumped or injected into the heated mixture in one lot or preferably in a series of additions. On the other hand, part of the catalyst may be present in the lactam when acetylene is added and/or while the mixture is being heated. The rest of the catalyst is then injected into the mixture at about 200° C. or more and again, the catalyst thus added may be in one or more portions. It is best that more than half of the catalyst be supplied at reacting temperatures.

Where the lactam remains liquid as temperatures are carried below 30° C., use of a solvent is not necessary, as the liquid lactam serves as a good solvent for acetylene. As acetylene is dissolved, the freezing point of the lactam mixture is lowered by it. Thus, for example, α-pyrrolidinone may be used without solvent with satisfactory conversions. Likewise, a normally solid lactam, if desired mixed with part of the catalyst, is melted and treated with acetylene. The mixture is cooled. As acetylene dissolves, the mixture remains liquid.

Where the lactam is a solid, sufficient solvent may be added to give a solution. Lower alkanols are particularly useful as solvents, even though they may form some vinyl ether, as does also the alkoxide portion of alkali metal alkoxides. This causes no difficulty, since the alkyl vinyl ethers are readily separated and are useful compounds in their own right.

A vinyl lactam may be used to give a fluid reaction mixture, thus avoiding the necessity of adding separate solvent. Hence, in recycling unreacted lactam, some vinyl lactam may be recycled with it.

There may also be used an acetylene solvent, such as dimethyl formal, diethyl formal, dimethyl acetal, diethyl acetal, dioxane, dioxolane, 2-methyl dioxolane, the monomethyl, dimethyl, monoethyl, diethyl, monopropyl, dipropyl and butyl ethers of ethylene glycol, diethylene glycol, triethylene glycol, or tetraethylene glycol, tetrahydrofuran, ethyl ether, isopropyl ether, and ethers in which a sulfur replaces oxygen as in

CH₃OCH₂CH₂SCH₂CH₂OCH₃

Mixtures of two or more of such solvents or mixtures of such a solvent or solvents and a lower alkanol or a vinyl lactam may be used. Some of the acetylene solvents are also alcohols, and thus serve a dual purpose since they can be used to dissolve an alkali metal.

The amount of solvent may vary from zero up to 50% or more of the reaction mixture. Of course, the best efficiency is had when the amount of solvent is kept to a minimum for absorbing the required amount of acetylene and for maintaining the mixture fluid, even though not homogeneous, at lowest temperature of absorption.

The fluid reaction mixture comprising lactam, with or without catalyst and/or solvent, if used, is treated with acetylene at a temperature below about 30° C. The temperature used will be chosen with regard to the freezing point of the particular mixture in which acetylene is being dissolved and to the extent of conversion desired. The temperature of the mixture may be lowered progressively as acetylene is dissolved and temperatures even below 0° C., as down to —20° C., are sometimes desirable. Usually the temperature of the mixture is between 0° and 25° C.

Acetylene is dissolved in the mixture under pressure, the pressure being sufficient to cause solution of the amount of acetylene at the temperatures employed to give the desired conversion. Pressures of acetylene up to 500 p. s. i. g. may be used. In handling acetylene under pressure the usual precautions are taken, except that dilution with gas or vapor is unnecessary at the absorbing temperatures used. Generally acetylene pressures from 100 to 450 p. s. i. g. are utilized.

The lactam charged with acetylene is passed in liquid phase through a heating zone, where it is brought to a temperature of about 200° to 280° C., preferably 210° to 250° C. under pressure sufficient to maintain the liquid phase. It will be seen that gaseous acetylene is not handled at these temperatures and pressures. The pressures required to maintain the liquid phase are from about 1000 to 5000 p. s. i. g. Residence time in the heating zone is about a half minute to ten minutes. While longer times might be used, there is usually little to be thus gained and there are some disadvantages.

A convenient system, for effecting the reaction under the above conditions, comprises a tube, usually in the form of a coil, through which the mixture of lactam and acetylene is passed under pressure and in which it is heated. Catalyst is injected along the tube, especially at the section in which the mixture has been heated to the prescribed range of temperature. There is then almost at once a rise in temperature in the mixture passing through. One or more additional increments of catalyst may be supplied to ensure complete reaction of the acetylene with the lactam. The charge is passed through a pressure relief valve.

The reaction mixture is worked up. The mixture may be degassed with recovery and recirculation of any free acetylene. Volatile solvent, if used, is taken off and N-vinyl lactam separated and, if desired, purified. Unreacted lactam is recovered and recycled.

There are obvious variations which can be applied to my method without altering the basic considerations. Some typical ways of carrying out the process of this invention are presented in the following examples. These are given for purposes of illustration and not by way of limitation. Parts by weight are used unless otherwise designated.

*Example 1*

In an absorption vessel there is placed 511 parts of pyrrolidinone. The vessel is swept with nitrogen to remove air and acetylene is passed in with the vessel at 30° C. Up to 100 p. s. i. g. there are absorbed 52 parts of acetylene. The absorber is cooled at this point to 16° C. and acetylene is passed in until, at 290 p. s. i. g., there have been taken up 127 parts of acetylene.

The solution of acetylene in pyrrolidinone is then pumped under pressure of 1500 p. s. i. g. into a reaction zone comprising a coiled tube which is heated to about 225° C. As the solution enters the reaction zone, a solution of 5% potassium hydroxide in pyrrolidinone is injected into it to supply 0.75 mole percent of catalyst. Midway through the reaction zone, there is injected an equal amount of the catalyst solution. The temperature now is 230° C. The residence time in the reaction zone is 2.1 minutes.

The reaction mixture is passed through a relief valve into a vessel where it is degassed. The mixture is then distilled. As a first step volatile materials are taken off by flash-distillation, the pot temperature being carried to 120° C. with a pressure of 0.5 mm. and with the receiver cooled with solid carbon dioxide and acetone. The flash distillate is redistilled, and the fraction taken at 90° to 94° C./10 mm. is N-vinyl pyrrolidinone in an amount of 335 parts. There is recovered pyrrolidinone in an amount of 242 parts. The yield is, therefore, about 94% based on pyrrolidinone.

*Example 2*

To 680 parts of pyrrolidinone there is added 1.2 parts of potassium hydroxide. When this has dissolved, the resulting solution is charged to an absorption vessel, to which acetylene is passed until with the temperature at 25° C. and the pressure at 290 p. s. i. g., there are absorbed 135 parts of acetylene.

This liquid mixture is passed through a coil heated to 230° C., the pressure being 1500 p. s. i. g. The residence time is 2.6 minutes. Half way through the coil there is injected, as the mixture flows, 20 parts of 6% solution of potassium hydroxide in pyrrolidinone. The liquid is collected in a vessel in which it is degassed and cooled. It is flash-distilled as above and the flash distillate is fractionated. A fraction of 266 parts is collected at 91° to 93° C./10 mm. which corresponds by analysis and properties to N-vinyl pyrrolidinone. There are recovered 442 parts of pyrrolidinone.

Example 3

The procedure of the previous example is followed except that each charge of catalyst is one-half that used above, and the temperature is increased to 250° C. Here the N-vinyl pyrrolidinone amounts to 243 parts, and the recovered pyrrolidinone is 458 parts.

Example 4

There are added two parts of potassium metal to 220 parts of isopropanol under a nitrogen blanket. The potassium reacts forming a solution of the alkoxide. There are then added 100 parts of dimethoxyethane and 339 parts of epsilon-caprolactam. The mixture is stirred until homogeneous and passed into an absorption vessel. With the temperature at 30° C., the mixture is charged with 114 parts of acetylene under 300 p. s. i. g. The resulting solution is pumped under a pressure of 1500 p. s. i. g. through a coiled tube heated to about 200° C. Residence time is about two minutes. Midway through the coiled tube a solution of two parts of potassium in isopropanol is injected as the reaction mixture passes. The reaction mixture is collected in a vessel, the pressure on which is relieved while the mixture is cooled. The reaction mixture is flash-distilled with a final pot temperature of 140° C. and a pressure of 0.5 mm. The flash-distillate is carefully fractionated. At 64° to 66° C./0.45 mm. there is collected a fraction of 206 parts of N-vinyl caprolactam. No attempt was here made to recover caprolactam.

The procedure is repeated with 3,3,5-trimethyl pyrrolidinone. There is obtained in a yield of 93% 1-vinyl-3,3,5-trimethyl pyrrolidinone, distilling at 50° to 52° C./0.5 mm., having a refractive index of 1.4817 at 25° C.

From 3-methyl pyrrolidinone there is obtained by the same procedure a 94% yield of 1-vinyl-3-methyl pyrrolidinone, distilling at 86° C./10 mm. and having a refractive index of 1.4969 at 25° C.

From 5,5-dimethyl-2-pyrrolidinone there is obtained in the same way 1-vinyl-5,5-dimethyl-2-pyrrolidinone, distilling at 57° to 60° C./0.2 mm. and having a refractive index of 1.4840 at 25° C.

Example 5

The above procedure is followed with 297 parts of piperidinone in place of the above lactam. There is obtained at 70° to 72° C./2 mm. a fraction of 189 parts of N-vinyl piperidone.

Example 6

There are mixed 100 parts of dimethoxyethane and 113 parts of caprolactam. The mixture is warmed and stirred until homogeneous, cooled to 25° to 30° C., and charged with 40 parts of acetylene. The resulting solution is pumped at 1500 p. s. i. g. pressure into a heated tube at 210° C. When the liquid in the tube has reached this temperature, there is injected at three points a total of 0.75 mole percent of potassium butoxide in butanol. Residence time is 2.1 minutes. The reaction mixture is treated as above. The conversion to N-vinyl caprolactam is 33%. In this case, caprolactam is recovered and from the amount of caprolactam not recovered, the yield is 78%.

The method of this invention is particularly efficient when caprolactam is used, as the method of the prior art gives a major proportion of by-products.

Example 7

To 100 parts of butyl alcohol there is added 0.6 part of sodium metal with stirring under a nitrogen atmosphere. Sodium butoxide is formed. There is added 430 parts of pyrrolidinone. The resulting mixture is passed into an absorption vessel where 70 parts of acetylene are pressed in at 365 p. s. i. g. The temperature is lowered to 10° C. The mixture of lactam and acetylene is pumped under a pressure of 1800 p. s. i. g. through a coil heated to about 250° C. with a residence of 1.8 minutes. When the reaction mixture is one-third through the coil, there is continuously injected a solution of sodium in butanol in an amount of 0.6 part for the entire mixture. At a point two-thirds along the coil this procedure is repeated. The reaction mixture is taken off, degassed, and worked up as above. At 91° to 93° C./10 mm. there is obtained a fraction of 300 parts of N-vinyl pyrrolidinone. The yield is over 95% based on pyrrolidinone not recovered.

It should be commented, however, that potassium is preferred as a catalyst over sodium as, in many systems, potassium salts of the lactams are more soluble in the reaction mixture than are the sodium salts. Of course, if auxiliary solvents are used, this difference disappears.

Example 8

A solution of 10 parts of potassium metal is made in 442 parts of pyrrolidinone under a nitrogen atmosphere. Another 442 parts of pyrrolidinone is placed in an absorber where it is heated at 30° C. with acetylene to a pressure of 100 p. s. i. g. The temperature is then lowered to 16° C. and acetylene is passed in at this temperature to a pressure of 300 p. s. i. g. At this point, 78 parts of acetylene have been absorbed.

The acetylene-pyrrolidinone is pumped at 1800 p. s. i. g. through a coil heated to 250° C. The residence time is 1.8 minutes. The above mentioned potassium solution is injected continuously in equal amounts at two points in the coil, (a) immediately after reaching 250° C. and (b) mid-way through the coil. A maximum temperature of 265° C. is attained. The catalyst solution is injected at a rate sufficient to supply 1.2 mole percent based on the original charge of pyrrolidinone. The reaction mixture is worked up as above. There is obtained N-vinyl pyrrolidinone in an amount of 298 parts, corresponding to almost 55% conversion. The yield is over 95% based on unrecovered pyrrolidinone.

The N-vinyl lactams are useful as solvents, as for example, in dissolving chemical compounds which are herbicides to provide useful solutions for dispersing in aqueous sprays. They are also useful in providing soluble homopolymers of known utility and also copolymers with other polymerizable vinylidene compounds for use in coatings, textile finishes, paper coatings, oil additives, synthetic fibers, and films, molding powders, and castings.

The process of this invention provides good conversions with high yields. It proceeds very rapidly with formation of few, if any, by-products. It is readily controllable and can be performed in simple kinds of apparatus with safety, efficiency, and economy. By control of the rate of injection of catalyst solution and particularly by injection of catalyst at several points, it becomes possible to control the reaction temperature and to operate at high conversion and yield.

I claim:

1. A process for vinylating lactams which comprises saturating between —20° and 30° C. with acetylene under pressure a liquid mixture containing a lactam having hydrogen on the nitrogen thereof, heating the resulting mixture to a reacting temperature between 200° and 280° C. under a pressure sufficient to maintain the reacting mixture entirely in liquid phase, injecting into the heated mixture under pressure a solution of an alkali metal catalyst, the alkali metal being a member of the class consisting of sodium and potassium, and separating the resulting N-vinyl lactam.

2. A process for preparing N-vinyl lactams which comprises absorbing acetylene under pressure in a liquid mixture containing a lactam having hydrogen on the nitrogen thereof at a temperature from about —20° to 30° C., heating the resulting mixture to a reacting temperature between 200° and 280° C. under pressure sufficient to maintain the reacting mixture entirely in liquid phase, injecting into the heated mixture under pressure a solution of an alkali metal catalyst, the alkali metal having an atomic weight from 23 to 39, and separating the resulting N-vinyl lactam.

3. A process according to claim 2 wherein the catalyst is the potassium salt of the lactam.

4. A process for preparing N-vinyl lactams which comprises absorbing acetylene under pressures from 100 to 500 p. s. i. g. in a liquid lactam of the formula

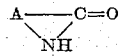

wherein A is an alkylene group having three to ten carbon atoms with three to five of these between the —NH— and the carbonyl groups at a temperature from 30° to —20° C., heating the resulting mixture to a reacting temperature between about 200° and 280° C. under pressure from 1000 to 5000 p. s. i. g. sufficient to maintain the mixture entirely in liquid phase, injecting into the heated mixture under pressure a solution of an alkali metal catalyst, the alkali metal having an atomic weight from 23 to 39 and being from 0.01 to about five mole percent of the lactam, and separating N-vinyl lactam.

5. A process according to claim 4 wherein there is present along with the lactam a lower alkanol.

6. A process according to claim 5 wherein the catalyst is supplied as an alkali metal lower alkoxide.

7. A process for preparing N-vinyl pyrrolidinone which comprises absorbing acetylene under pressure from 100 to 500 p. s. i. g. in pyrrolidinone in liquid state at not over 30° C., heating the resulting mixture at a reacting temperature between about 200° and 280° C. under a pressure from about 1000 to 5000 p. s. i. g. sufficient to maintain the mixture in liquid phase, injecting into the heated mixture under pressure a solution of an alkali metal catalyst, the alkali metal having an atomic weight from 23 to 39, and separating N-vinyl pyrrolidinone.

8. A process for preparing N-vinyl piperidinone which comprises absorbing acetylene under pressure from 100 to 500 p. s. i. g. in piperidinone in liquid phase between 30° and —20° C., heating the resulting mixture at a reacting temperature between about 200° and 280° C. under a pressure from about 1000 to 5000 p. s. i. g. sufficient to maintain the mixture in liquid phase, injecting into the heated mixture under pressure a solution of an alkali metal catalyst, and separating N-vinyl piperidinone.

9. A process for preparing N-vinyl caprolactam which comprises absorbing acetylene under pressure from 100 to 500 p. s. i. g. in caprolactam in a liquid phase between 30° and —20° C., heating the resulting mixture at a reacting temperature between about 200° and 280° C. under a pressure from about 1000 to 5000 p. s. i. g. sufficient to maintain the mixture in liquid phase, injecting into the heated mixture under pressure a solution of an alkali metal catalyst, and separating N-vinyl caprolactam.

No references cited.